United States Patent [19]

Huang

[11] Patent Number: 4,969,230

[45] Date of Patent: Nov. 13, 1990

[54] DETACHABLE FRONT WHEEL ASSEMBLY FOR A PUSHCART

[76] Inventor: Min-Tai Huang, 4 Fl., No. 302, Pai Ling Wu Rd., Taipei, Taiwan

[21] Appl. No.: 385,094

[22] Filed: Jul. 26, 1989

[51] Int. Cl.⁵ .................... B60B 33/02; E05D 11/10
[52] U.S. Cl. .......................................... 16/30; 16/29; 16/35 R
[58] Field of Search ................ 16/30, 29, 31 R, 31 A, 16/35 R

[56] References Cited

U.S. PATENT DOCUMENTS

| | | | |
|---|---|---|---|
| 4,608,729 | 9/1986 | Huang | 16/35 R |
| 4,847,945 | 7/1989 | Schwartz | 16/30 |
| 4,854,008 | 8/1989 | Kuo | 16/30 |
| 4,897,895 | 2/1990 | Wang | 16/29 |

Primary Examiner—Richard K. Seidel
Assistant Examiner—Carmine Cuda
Attorney, Agent, or Firm—Morton J. Rosenberg; David I. Klein

[57] ABSTRACT

A detachable front wheel assembly for a pushcart including a sleeve being engagable onto a front leg of a pushcart. A dovetail slot is formed in the sleeve, and two openings communicate with the dovetail slot. A coupling shaft has a vertical dovetail and a protuberance formed on the vertical dovetail. The coupling shaft is insertable into the sleeve with the vertical dovetail slidably engaged within the dovetail slot of the sleeve. The front leg of the pushcart is insertable through the sleeve and then into the coupling shaft so that the coupling shaft and the front leg can be fixed together. Two guides are formed on the coupling shaft. The protuberance of the coupling shaft is engagable within either opening for determining the relative positions between the coupling shaft and the sleeve. A wheel seat with a front wheel is engagable onto the coupling shaft. An annular notch is formed at an intermediate position of the wheel seat so that the guides are limited and rotatable along the annular notch. Therefore, the wheel is rotatable freely with respect to the front leg of the pushcart.

5 Claims, 6 Drawing Sheets

DETACHABLE FRONT WHEEL ASSEMBLY FOR A PUSHCART

FIELD OF THE INVENTION

The present invention relates to a front wheel assembly, and more particularly to a detachable front wheel assembly for a pushcart.

BACKGROUND OF THE INVENTION

Rotatable front wheels are widely used on pushcarts for steering the pushcarts.

Normally, the whole set of front wheels is rigidly fixed onto a front and lower end of a frame of the pushcart by means of such as riveting. The front wheel set can not be removed for transportation purposes. Therefore, several problems, especially packing and transportation problems, have arisen due to the considerable size of the packing. Normally, the pushcart can be folded into a column, and the two front wheel sets located at one end of the column have a lateral cross sectional area twice the lateral cross sectional area of the column. Because of the undetachability of the front wheel set of the pushcart, the packing size can not be reduced. Therefore, a large packing size is required, which causes large transportation fees especially when shipping abroad. Besides, the front wheel set is always the first part to be worn out or damaged. The wheels can not be replaced easily.

The present invention has arisen to mitigate and/or obviate the afore-described disadvantages of the conventional pushcart.

SUMMARY OF THE INVENTION

The primary object of the present invention is to provide a detachable front wheel assembly for a pushcart, which could be easily detached or assembled in order that a packing size is greatly reduced for reducing the transportation fees thereof.

Another object of the present invention is to provide a detachable front wheel assembly for a pushcart, in which the front wheel assembly can be replaced easily.

The present invention seeks to provide a detachable front wheel assembly for a pushcart which includes a sleeve having a center hole for receiving a front leg of a pushcart. An enlarged hole is formed at a lower part of the sleeve. A dovetail slot is formed in the enlarged hole of the sleeve. A coupling shaft has a vertical dovetail and a protuberance formed on the vertical dovetail. A pair of opposite pin holes are formed on the coupling shaft so that a pin is insertable through the pin holes and two opposite pin holes formed on the front leg for connecting the coupling shaft and the front leg. Two guides are formed on the coupling shaft. The coupling shaft is insertable into the enlarged hole of the sleeve with the vertical protrusion slidable along the vertical slot. The protuberance is engageable within the opening. A wheel seat has a cylinder which has an annular notch formed at an intermediate position of the cylinder and is engageable onto the coupling shaft so that the guides are limitedly rotatable along the annular notch. A flange plate is fixed on the wheel seat for attaching wheels. Therefore, the wheel is rotatable freely with respect to the front leg of the pushcart.

Further objects and advantages of the present invention will become apparent from a careful reading of the detailed description provided hereinbelow, with appropriate reference to the accompanying drawings.

DETAILED DESCRIPTION OF THE INVENTION

Figure 1:
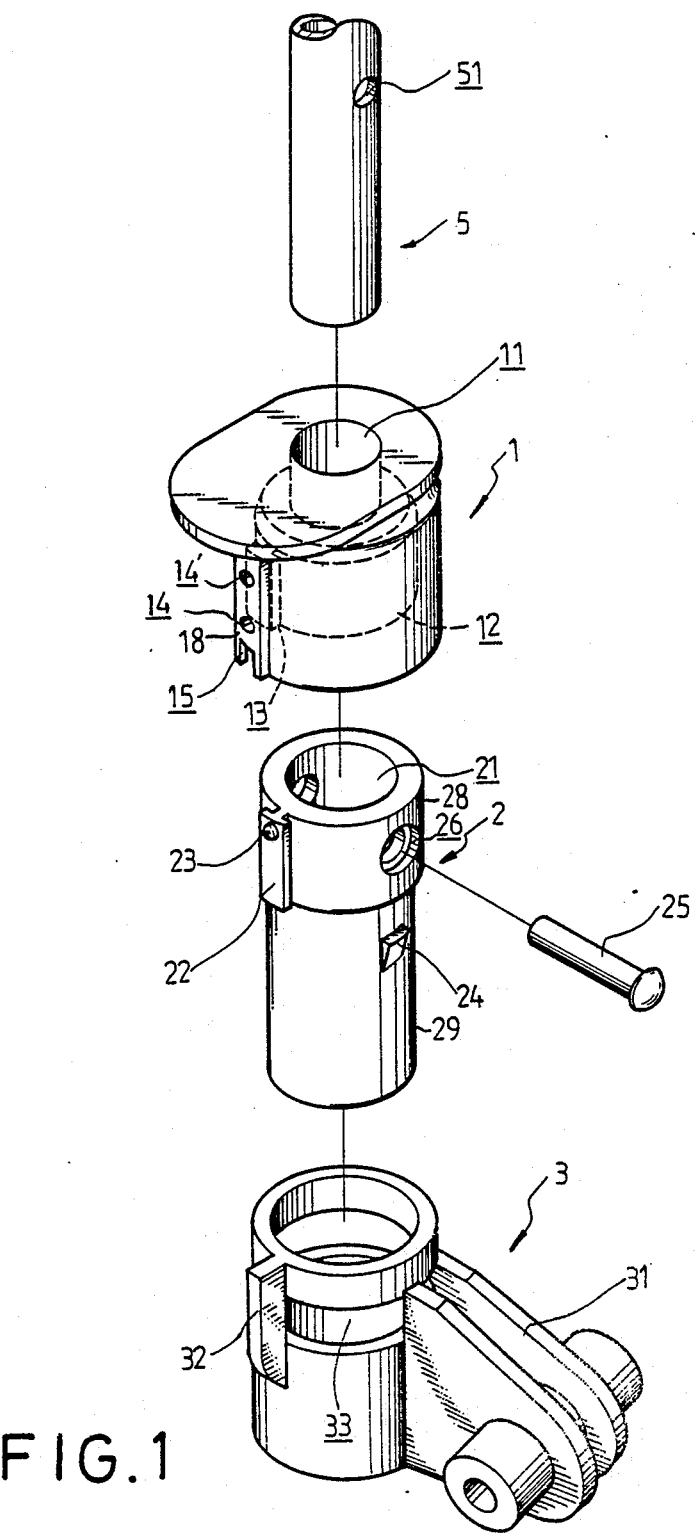
FIG. 1 is a partial perspective view of a detachable front wheel assembly in accordance with the present invention.
Figure 2:
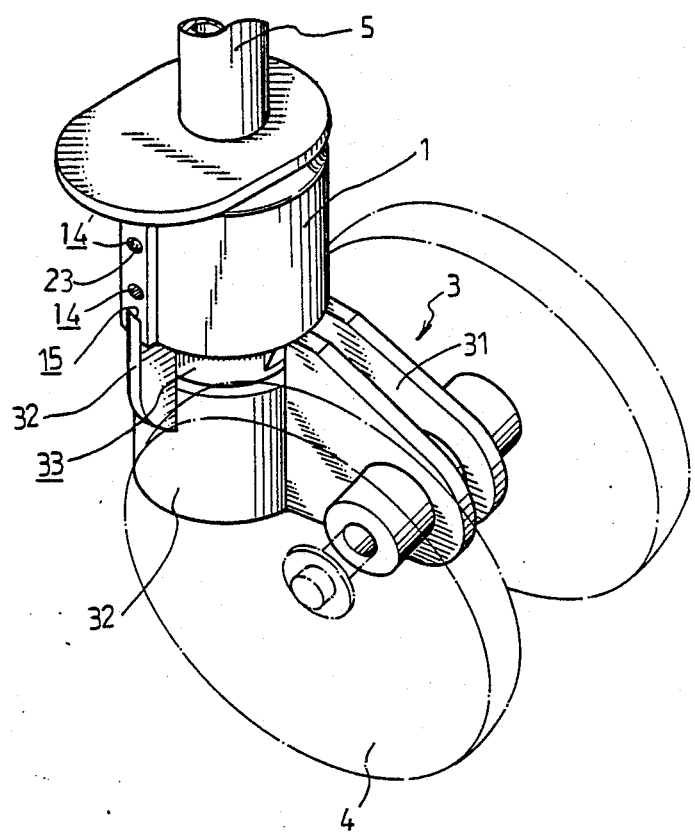
FIG. 2 is an exploded view of the detachable front wheel assembly of FIG. 1.

Referring to the drawings and initially to FIGS. 1 and 2, the detachable front wheel assembly for a pushcart in accordance with the present invention generally comprises a sleeve 1, a coupling shaft 2 and a wheel seat 3. All these parts are substantially made of plastic materials.

The sleeve 1 is generally a cylinder with a center hole 11 at an upper portion thereof and an enlarged inner diameter hole (enlarged hole) 12 extending therethrough. The center hole 11 is suitable for receiving a frame body 5, specifically a front leg, of the pushcart. A vertical T-shaped dovetail slot (vertical slot) 13 is formed in the wall of the sleeve 1. A vertical guide block 18 with two openings 14, 14' and a notch 15 is formed on an outer peripheral surface of the sleeve 1 and arranged parallel to the vertical slot 13.

Figure 3:
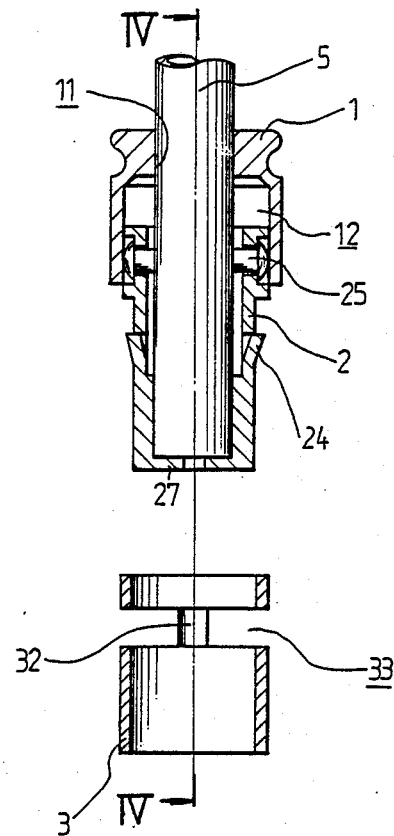
FIG. 3 is a front elevational partial cross sectional view, illustrating an assembled front wheel assembly in accordance with the present invention before attaching to a pushcart.

The coupling shaft 2 is generally a short cylinder with a bore 21. A shoulder 27 (FIG. 3) is formed at a lower end of the bore 21 for limiting the movement of the front leg 5 of the pushcart. An upper part 28 of the coupling shaft 2 has a larger outer diameter as compared with the outer diameter of the lower part 29. Two opposite pin holes 26 are formed on the upper part of the coupling shaft 2 for engaging a pin or a rivet 25. The pin 25 is insertable through the pin holes 26 and a pair of pin holes 51 are formed on the front leg 5 of the pushcart so that the coupling shaft 2 is fixed relative to the front leg 5 (FIG. 3). A vertical T-shaped protrusion 22 with a protuberance 23 is formed on the outer surface of the upper part 28 of the shaft 2 for making a dovetail joint with the dovetail slot 13 of the sleeve 1. The protuberance 23 can be engaged within either the upper or the lower opening 14, 14' for determining a relative position of the shaft 2 with respect to the sleeve 1. A pair of resilient guides 24 protrude from the lower part 29 of the couplingshaft 2. The lower end of each guide 24 is rigidly fixed on the shaft 2, and the upper end of each guide 24 extends slightly outward so as to form a substantially wedge shaped element.

The wheel seat 3 is also generally a cylinder with an annular notch 33 formed at an intermediate position thereof so that the wheel seat 3 is separated into an upper ring and a lower ring which are rigidly connected by a stop 32 substantially extending in a vertical direction. The guides 24 are slidable along the annular notch 33 when the coupling shaft 2 is engaged in the wheel seat 33 so that the wheel seat 3 is limited to rotate with respect to the coupling shaft 2 by means of the guides 24; hence, no relative axial movement between the coupling shaft 2 and the wheel seat 3 is allowed. Conversely, when the wheel seat 3 is to be removed, the only process required is pressing both guides 24 inward such that the wheel seat 3 can be pulled out and removed from the coupling shaft 2. A pair of flange plates 31 are rigidly fixed onto the cylinder for attaching wheels 4.

Figure 4:
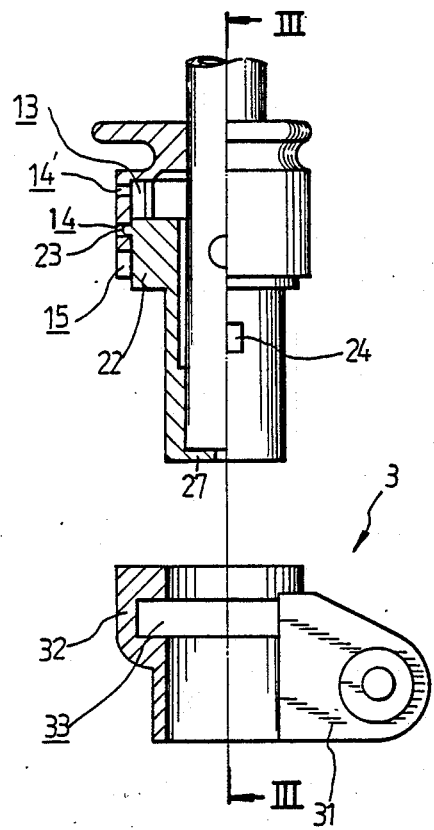
FIG. 4 is a side elevational partial cross sectional view similar to FIG. 3.

Referring next to FIGS. 3 and 4, it can be seen that the wheel seat 3 is separated from the coupling shaft 2. The upper part 28 of the shaft 2 is engaged within the enlarged hole 12 of the sleeve 1 with the T-shaped vertical protrusion 22 of the shaft 2 being engaged within the vertical slot 13 of the sleeve 1. The protuberance 23 is engaged within the lower opening 14 (FIG. 4). The front leg 5 of the pushcart is fixed with respect to the coupling shaft 2 by means of the pin or rivet 25 (FIG. 3).

Figure 5:
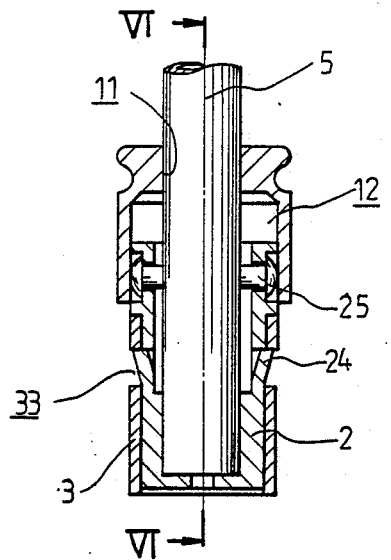
FIGS. 5 and 6 are similar to FIGS. 3 and 4 respectively with the front wheel assembly attaching to a pushcart, in which the front wheel assemblies are freely rotatable.
Figure 6:
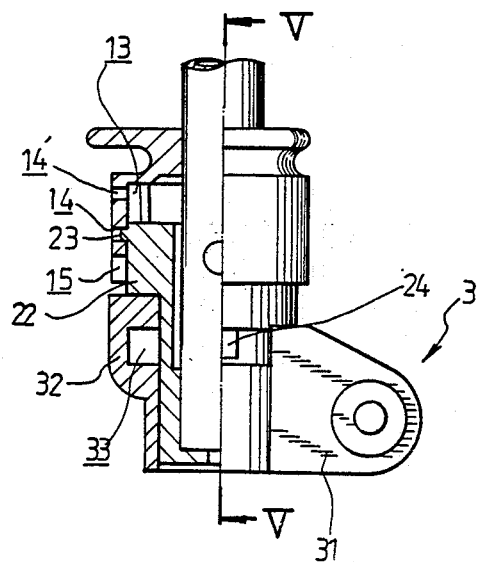

Referring next to FIGS. 5 and 6, it can be seen that the wheel seat 3 is forced to press and bypass the resilient guides 24 of the coupling shaft 2 until the guide 24 is limited and rotatable along the annular notch 33 of the wheel seat 3. At this moment, the wheel seat 3 can rotate freely with respect to the coupling shaft 2 by means of the movement of the guide 24 along the annular notch 33, since the stop 32 is not engaged with the notch 15 of the sleeve 1. Therefore, the front wheel of the pushcart can rotate freely. It is to be noted that the protuberance 23 is still engaged within the lower opening 14 of the sleeve 1.

Figure 7:
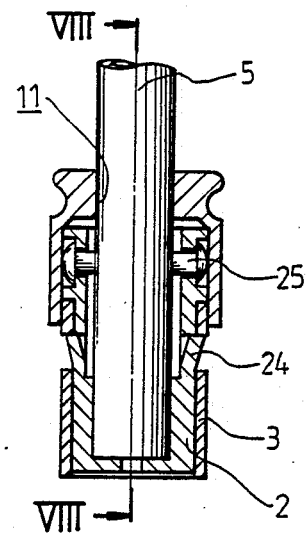
FIGS. 7 and 8 are similar to FIGS. 5 and 6 respectively, in which the front wheel assemblies are fixed at a constant orientation.
Figure 8:
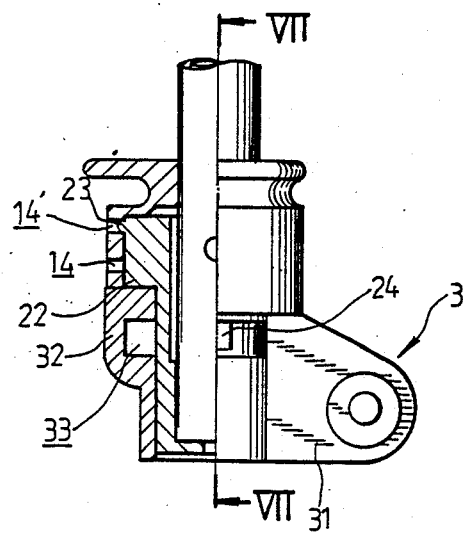

Referring next to FIGS. 7 and 8, it can be seen that the protuberance 23 of the coupling shaft 2 is engaged within the upper opening 14' of the sleeve 1 by further pressing the wheel seat 3 onto the coupling shaft 2. The coupling shaft 2 and the wheel seat 3 move upward with respect to the sleeve 1 so that the vertical stop 32 is engaged within the notch 15 of the sleeve 1. At this moment, the sleeve 1, the coupling shaft 2 and the wheel seat 3 are fixed relative to the front leg 5 of the pushcart so that the front wheel of the pushcart is fixed at a predetermined direction and is not freely rotatable.

Accordingly, the present invention has the following advantages:

(a) The wheel seat 3 and the front wheels 4 of the pushcart can be attached and removed easily from the front leg 5 of the pushcart. The wheel seat 3 can be forced onto the coupling shaft 2 easily, and the only process to remove the wheel seat 3 is simply pressing the resilient guides 24 and pulling the wheel seat 3.

(b) Subsequently, the front wheel assembly in accordance with the present invention can be replaced easily if the front wheel is worn out or damage.

(c) The pushcart and the front wheel assembly can be packed separately for reducing the package size of the pushcart. The transportation fees can be reduced remarkably.

Although this invention has been described with a certain degree of particularity, it is to be understood that the present disclosure has been made by way of example only and that numerous changes in the detailed construction and the combination and arrangement of parts may be restored to without departing from the spirit and scope of the invention as hereinafter claimed.

I claim:

1. A detachable front wheel assembly for a pushcart comprising a sleeve having a center hole at an upper part thereof for receiving a front leg of said pushcart, an enlarged hole being formed at a lower part of said sleeve, a vertical slot being formed in said enlarged hole, and a first opening being formed on said sleeve and communicating with said vertical slot; a coupling shaft having a vertical protrusion extending in a direction parallel to a longitudinal axis thereof, a protuberance being formed on said vertical protrusion, a pair of opposite pin holes being formed on an upper part of said coupling shaft for receiving a pin, said pin being insertable through said pin holes and a pair of pin holes formed on said front leg for connecting said coupling shaft and said front leg, and at least one guide formed on a lower part of said coupling shaft, said coupling shaft being insertable into said enlarged hole with said vertical protrusion slidable along said vertical slot, said protuberance being engagable within said first opening; and a wheel seat being substantially a cylinder having an annular notch formed at an intermediate position thereof, said wheel seat being engagable onto said coupling shaft so that said guide is limited within and rotatable along said annular notch, and a flange plate fixed on said wheel seat for attaching wheels; said wheel seat being rotatable freely with respect to said front leg of said pushcart.

2. A detachable front wheel assembly as set forth in claim 1, wherein said vertical slot is a dovetail slot, and said vertical protrusion is a dovetail.

3. A detachable front wheel assembly as set forth in claim 1, wherein a second opening is further provided on said sleeve above said first opening, both said first and second openings are arranged vertically and separated by a distance, a notch is formed below said openings, and a vertical stop is rigidly attached to said wheel seat and extending in a vertical direction parallel to a longitudinal axis of said wheel seat; said wheel seat is freely rotatable with respect to said front leg of said pushcart when said protuberance is engaged in said first opening which is located lower than said second opening, and said stop is engaged in said notch so that said wheel seat is fixed relatively to said front leg of said pushcart when said protuberance is engaged in said second opening.

4. A detachable front wheel assembly as set forth in claim 1, wherein said guide is a resilient element with an upper end protruding outward from said coupling shaft.

5. A detachable front wheel assembly as set forth in claim 4, wherein two guides are used.

* * * * *